US009787979B2

(12) United States Patent
Boyce et al.

(10) Patent No.: US 9,787,979 B2
(45) Date of Patent: Oct. 10, 2017

(54) LEVEL SIGNALING FOR LAYERED VIDEO CODING

(71) Applicant: Vidyo, Inc., Hackensack, NJ (US)

(72) Inventors: Jill Boyce, Manalapan, NJ (US); Danny Hong, NY, NY (US); Wonkap Jang, Edgewater, NJ (US); Stephan Wenger, Hillsborough, CA (US)

(73) Assignee: VIDYO, INC., Hackensack, NJ (US)

( * ) Notice: Subject to any disclaimer, the term of this patent is extended or adjusted under 35 U.S.C. 154(b) by 554 days.

(21) Appl. No.: 13/849,766

(22) Filed: Mar. 25, 2013

(65) Prior Publication Data

US 2013/0266077 A1 Oct. 10, 2013

Related U.S. Application Data

(60) Provisional application No. 61/621,093, filed on Apr. 6, 2012.

(51) Int. Cl.
H04N 7/12 (2006.01)
H04N 19/44 (2014.01)
H04N 19/70 (2014.01)
H04N 19/30 (2014.01)
H04N 19/463 (2014.01)

(52) U.S. Cl.
CPC ....... H04N 19/00533 (2013.01); H04N 19/30 (2014.11); H04N 19/463 (2014.11); H04N 19/70 (2014.11)

(58) Field of Classification Search
USPC .................................................. 375/240.25
See application file for complete search history.

(56) References Cited

U.S. PATENT DOCUMENTS

| 2003/0067637 | A1 | 4/2003 | Hannuksela | |
|---|---|---|---|---|
| 2004/0008790 | A1* | 1/2004 | Rodriguez | H04N 5/76 375/240.26 |
| 2007/0110150 | A1* | 5/2007 | Wang | H04N 21/234327 375/240.1 |
| 2007/0230564 | A1* | 10/2007 | Chen | H04N 21/234327 375/240.01 |
| 2009/0060034 | A1 | 3/2009 | Park et al. | |
| 2009/0097549 | A1 | 4/2009 | Kim et al. | |
| 2009/0225870 | A1 | 9/2009 | Narasimhan | |

(Continued)

FOREIGN PATENT DOCUMENTS

| JP | 2007-537639 | 12/2007 |
|---|---|---|
| JP | 2009-531999 | 9/2009 |

(Continued)

OTHER PUBLICATIONS

International Search Report and Written Opinion for PCT/US2013/033646, dated Jun. 6, 2013.

(Continued)

Primary Examiner — Tracy Y Li
(74) Attorney, Agent, or Firm — Baker Botts L.L.P.

(57) ABSTRACT

Techniques to determine a level id in a layered bitstream are disclosed, such that the same level id can be used for all layers of a scalable bitstream. Also disclosed are techniques to signal level ids for sub bitstreams that can be indicative of lower computational requirements than the level id used for the layered bitstream.

5 Claims, 6 Drawing Sheets

(56) References Cited

U.S. PATENT DOCUMENTS

| | | | |
|---|---|---|---|
| 2010/0150224 A1* | 6/2010 | Pateux | H04N 21/2383 375/240.02 |
| 2010/0189182 A1* | 7/2010 | Hannuksela | H04N 21/234327 375/240.25 |
| 2011/0188580 A1 | 8/2011 | Valmiki et al. | |
| 2012/0183077 A1* | 7/2012 | Hong | H04N 19/70 375/240.25 |
| 2012/0269275 A1* | 10/2012 | Hannuksela | H04N 13/0048 375/240.25 |

FOREIGN PATENT DOCUMENTS

| | | |
|---|---|---|
| WO | WO 2005/112464 A1 | 11/2005 |
| WO | WO 2009/048502 A2 | 4/2009 |

OTHER PUBLICATIONS

Boyce, et al., "3D-HEVC HLS: SEI message for sub-bitstream profile & level indicators", 100. MPEG Meeting; Apr. 30, 2012-May 4, 2012; Geneva; (Motion Picture Expert Group or ISO/IEC JTC1/SC29/WG11), No. m24715, Jun. 7, 2012, XP030053058.

Boyce, et al., "SEI message for sub-bitstream profile & level indicators", 9. JCT-VC Meeting; 100. MPEG Meeting; Apr. 27, 2012-May 7, 2012; Geneva; (Joint Collaborative Team on Video Coding of ISO/IEC JTC1/SC29/WG11 and ITU-T SG. 16); URL: Http://WFTP3.ITU.INT/AV-ARCH/JCTVC-SITE/, No. JCTVC-I0231, Apr. 16, 2012, XP030111994, the whole document.

Boyce, et al., "SEI Message for profile and level signaling for temporal scalability and extensions", 10. JCT-VC Meeting; 101. MPEG Meeting; Jul. 11, 2012-Jul. 20, 2012; Stockholm; (Joint Collaborative Team on Video Coding of ISO/IEC JTC1/SC29/WG11 and ITU-T SG. 16); URL: Http://WFTP3.ITU.INT/AV-ARCH/JCTVC-SITE/, No. JCTVC-J0245, Jul. 2, 2012, XP030112607, the whole document.

Supplementary Partial European Search Report dated Sep. 7, 2015 in EP Application No. 13771784.9.

JP Office Action dated Dec. 21, 2015 in Japanese Patent Application No. 2015-504615.

* cited by examiner

FIG. 5

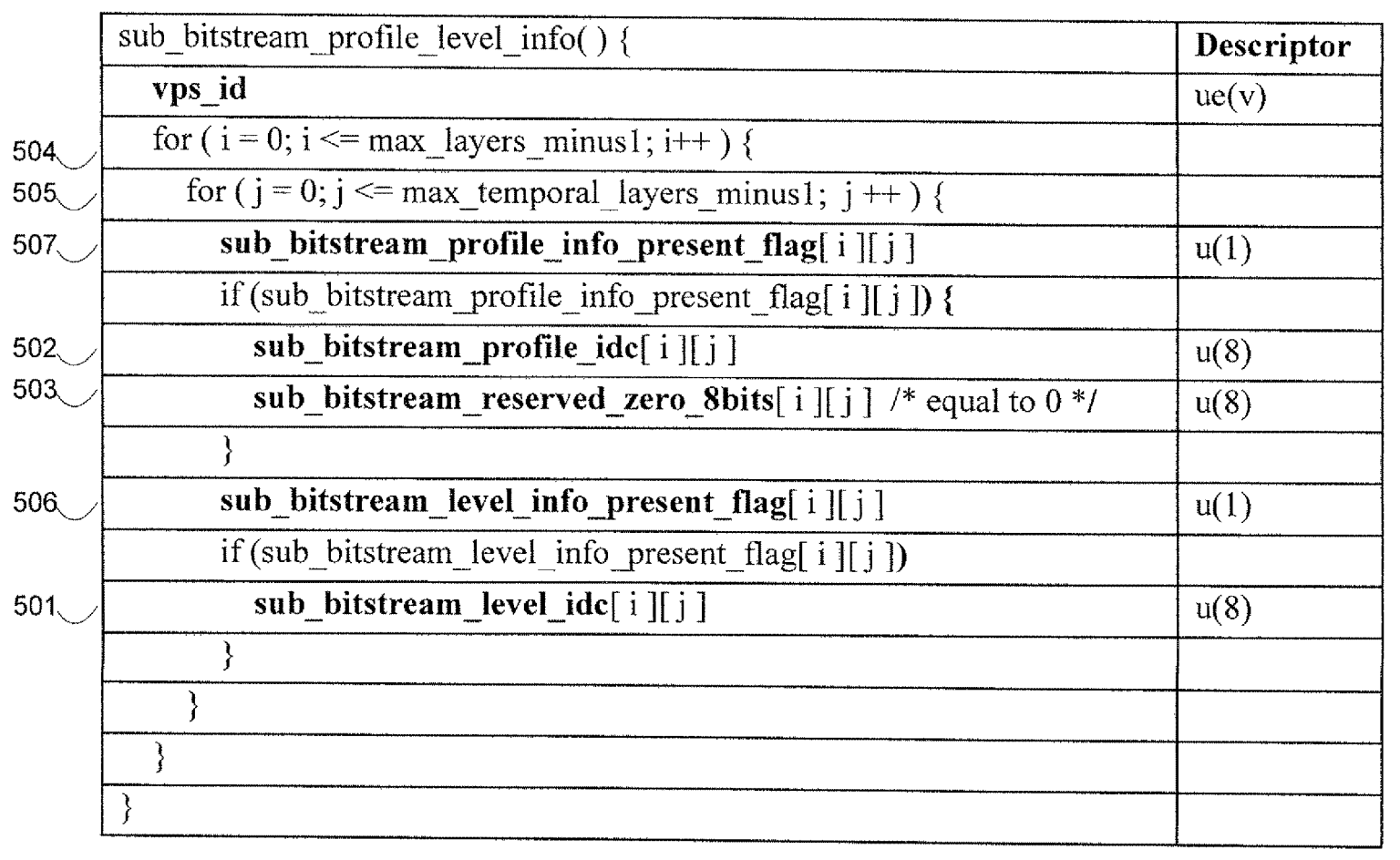

| | Descriptor |
|---|---|
| sub_bitstream_profile_level_info( ) { | |
|   vps_id | ue(v) |
|   for ( i = 0; i <= max_layers_minus1; i++ ) { | |
|     for ( j = 0; j <= max_temporal_layers_minus1; j++ ) { | |
|       sub_bitstream_profile_info_present_flag[ i ][ j ] | u(1) |
|       if (sub_bitstream_profile_info_present_flag[ i ][ j ]) { | |
|         sub_bitstream_profile_idc[ i ][ j ] | u(8) |
|         sub_bitstream_reserved_zero_8bits[ i ][ j ] /* equal to 0 */ | u(8) |
|       sub_bitstream_level_info_present_flag[ i ][ j ] | u(1) |
|       if (sub_bitstream_level_info_present_flag[ i ][ j ]) { | |
|         sub_bitstream_level_idc[ i ][ j ] | u(8) |
|       } | |
|     } | |
|   } | |
| } | |

LEVEL SIGNALING FOR LAYERED VIDEO CODING

CROSS-REFERENCE TO RELATED APPLICATIONS

This application claims priority to U.S. Ser. No. 61/621,093, titled "Level signaling for layered video coding", filed Apr. 6, 2012, the disclosure of which is hereby incorporated by reference in its entirety.

FIELD

The disclosed subject matter relates to video coding, and more specifically, to the representation of information related to the signaling of levels or other indications of required decoder capabilities in a layered bitstream.

BACKGROUND

Video coding refers to techniques where a series of uncompressed pictures is converted into a compressed, video bitstream. Video decoding refers to the inverse process. Many standards exist that specify techniques for image and video decoding operations, such as ITU-T Rec. H.264 "Advanced video coding for generic audiovisual services", March/2010, available from the International Telecommunication Union ("ITU"), Place de Nations, CH-1211 Geneva 20, Switzerland or http://www.itu.int/rec/T-REC-H.264, and incorporated herein by reference in its entirety, or High Efficiency Video Coding (HEVC) ((B. Bross et. al., "High Efficiency Video Coding (HEVC) text specification draft 9", available from http://phenix.int-evry.fr/jct/doc_end_user/documents/11_Shanghai/wg11/JCTVC-K1003-v13.zip), December 2012, referred to as "WD9" henceforth, which is incorporated herein by reference in its entirety).

Layered video coding, also known as scalable video coding, refers to video coding techniques in which the video bitstream can be separated into two or more sub-bitstreams, called layers. Layers can form a layer hierarchy, whereby a base layer can be decoded independently, and enhancement layers can be decoded in conjunction with the base layer and/or lower enhancement layers.

Some video decoding standards, such as H.264 or HEVC, utilize a profile/level system to signal in the bitstream the capabilities a decoder must possess to decode the bitstream. Profiles typically refer to a selection of coding technologies (known as "tools") specified in the video coding standards, whereas levels typically refer to a requirement of decoding a certain number of pixels, blocks, macroblocks, treeblocks, coding units, or similar units, per second. Therefore, levels can express the capability of a decoder to decode a bitstream up to a given (uncoded) picture size at a certain frame rate. Profiles and levels can be specified in a video coding standard such as H.264 or HEVC, in application standards, or can be agreed upon by vendors outside a standards process.

H.264 includes in its Annex G an extension to support layered coding, known as Scalable Video Coding or SVC. Annex H includes a multiview extension henceforth referred to as Multiview Video Coding or MVC. H.264 without enabled annexes G or H is referred to as AVC.

In SVC, multiple spatial, quality, or temporal layers may be coded, and a layer may be coded dependently upon another layer. The base layer is independent of any other layers, and is backwards compatible with AVC. SVC can use single-loop decoding for inter coded macroblocks, and multi-loop decoding for intra coded macroblocks.

In MVC, multiple views may be coded, and a view may be coded dependently upon another view. The base view is independent of any other view, and is backwards compatible with AVC. MVC uses multi-loop decoding, where if view A is a reference for view B, both view A and view B must be decoded in order to output view B.

H.264 includes sequence parameter sets, which contain information related all of the coded pictures in a video sequence. Within the sequence parameter set are syntax elements for profile and level indicators. Similarly, in SVC and MVC, the subset sequence parameter set has syntax elements for profile and level indicators. Subset sequence parameter sets are used in non-base layers or views, while sequence parameter sets are used in the base layer or view.

The SVC and MVC extensions provide mechanisms for sub-bitstream extraction of a target layer representation or view representation, whose output is a valid coded video bitstream including the NAL units associated with the target layer representation itself, as well as all layers with lower or equal values of the target dependency_id, quality_id, temporal_id, and priority_id.

In H.264, in each coded slice header there is a picture parameter set id syntax element, which refers to the picture parameter set (PPS). The PPS contains parameters which stay constant for the whole coded picture, but may change between two pictures. One syntax element in the PPS is an index to the sequence parameter set id, which refers to a sequence parameter set (SPS). All coded slices in the same layer in SVC or same view in MVC, throughout the coded video sequence, refer to the same SPS or subset sequence parameter set.

The sequence parameter sets can contain information about image resolution, video usability information, etc., as well as profile and level indicators. It is allowable for more than one view in MVC to refer to the same sequence parameter set. Similarly, it is allowable for more than one SVC layer to refer to the same sequence parameter set.

H.264 places various restrictions on compliant coded bitstreams through its profile and level indicators. Profile and level indicators can specify a conformance point, and the presence of profile and level information in a bitstream can allow a decoder or Media Aware Network Element (MANE) to determine if it has the capability to decode or otherwise process a particular bitstream. Profiles generally specify the set of supported coding tools, while levels generally specify constraints that impact computational demands.

With respect to levels, H.264 provides a table mapping each allowable level_id value to constraints on parameters, such as maximum picture size, bitrate, and macroblock throughput. In particular, the macroblock throughput limit restricts the maximum number of macroblocks per second, or MaxMBPS. As the size of a macroblock is 16×16 samples, MaxMBPS is closely related to the pixel rate per second, except that the MaxMBPS calculation considers that each coded picture must contain an integer number of macroblocks, and hence the vertical and horizontal resolutions must be rounded up to the nearest macroblock size.

For the (single layer/view) AVC profiles, including those used as an SVC base layer or MVC base view, assuming a fixed frame rate, FrameRate, the maximum MB throughput is restricted such that level limit MaxMBPS>=PicSizeInMbs*FrameRate. Note that the description of the constraint of the level limit in the standards document does not assume a fixed frame rate, and is expressed as a limit on the minimum output time between frames. The above equation is a simplification (assuming fixed frame rates) of H.264's description (which allows for variable frame rates).

For the profiles associated with SVC and MVC, where multiple scalable layers or views are to be decoded, the interpretation of the max MB per second throughput is modified, based upon the number of layers or views, as described below.

In the SVC extension, in a subset sequence parameter set for a non-base layer, the level limit expresses a constraint of the maximum MB throughput MaxMBPS>=svcPicSizeInMbs*FrameRate, where the value of svcPicSizeInMbs is based on the number of layers and the picture size of the active layer and its reference layers, again under the assumption of a fixed frame rate.

Referring to FIG. 1, shown is a layer hierarchy with a base layer (101), two spatial or SNR enhancement layers (102) and (103) that use the base layer (101) as their reference layer, and a third spatial or SNR enhancement layer (104) that uses the base layer (101) and enhancement layer (102) as its reference layers. Each of the layers (101) through (104), according to H.264, has a level (105-108, respectively) associated that is coded as the level_id field in the sequence parameter set. The level (105) associated with the base layer (101) can indicate the computational demand of the base layer in isolation, expressed by referring to the level table specified in H.264. In particular, according to H.264, the level_id coded for the base layer (101) can be chosen such by the encoder that all coding parameters associated with that level (such as: maximum picture size, macroblock per second throughput, and so on) are larger or equal than the requirement to decode the bitstream according to that level.

The levels (106-108) for the enhancement layers (102-104), according to H.264, can be coded such that the computational requirements associated with the coded level are larger than the computational requirements for decoding the enhancement layer (102-104) in question, and all its reference layers, in combination. For example, the level indicator (108) for enhancement layer (104) is chosen such that, for all computational requirements indicated through the level indicator (108), the respective computational complexity is larger than the computational complexity required to decode all layer (104) and its reference layers (102) and (101) in combination. In FIG. 1, this is shown by the dashed line (110) surrounding layers (101) (102) and (104). Similarly level indicator (107), coded in the sequence parameter set of enhancement layer (103) can be chosen such that the computational demands for decoding enhancement layer (103) and base layer (101) in combination are lower than what is indicated in the level indicator (107). This is shown by the punctuated line (111) around layers (101) and (103).

In the MVC extension, in a subset sequence parameter set for a non-base view, the level limit expresses a constraint of the maximum MB throughput MaxMBPS>=(NumViews/2)*PicSizeInMbs*FrameRate, where NumViews refers to the number of views required for decoding the target output view, once more under the assumption of a fixed frame rate.

In MVC, because the MB throughput limit is based upon the number of views, multiple view layers whose SPS parameter values are otherwise identical, e.g. with the same image resolution and VUI data, can differ in their level indicator value. If they do, they can refer to different SPS ids, because, in H.264, each SPS can contain only a single level indicator. The alternative, referring to the same SPS with a level indicator sufficiently high to indicate computational resources sufficient to decode all views (even if, for example, only the base view is to be decoded), may be problematic. For example, if one were coding a level indicator higher than necessary for the base view, that base view (which, coincidentally, can be a fully conformant AVC bitstream suitable for non-multiview decoding) potentially might not be decoded on devices with sufficient computational resources, because the level indicator indicates a higher level (to accommodate multiple view) than necessary for single view decoding.

For both SVC and MVC, one SPS for each layer or view can be inefficient for several reasons. To describe those reasons, briefly described is the parameter set referencing mechanism of H.264. Referring to FIG. 2, shown is the relationship between the slice header, PPS, and SPS. The slice header (201) can contain a variable length (ext-Golomb) coded field (202) that indicates the PPS (203) to be used. For a PPS (203) with the ID 0, that field (202) is 1 bit in length. For values 1 or 2, the field is 3 bits in length.

For values of 3 and larger, it is at least 5 bits in length. Within the PPS, there can be an indication (204) indicating an SPS (205). Inside the SPS (205), there can be a self-reference (206) (which can be used to identify the SPS during its transmission). Note that a video stream can contain many SPSs and PPSs, and, on a per picture or per video sequence basis, the encoder can switch them by coding the appropriate PPS ID (202) in the slice header (201).

As to the first reason, in H.264 it may required to include multiple SPSs (207) in the bitstream (or send them out of band) that may differ only by the level indicator (208). However, many other syntax elements of the SPS can also be necessary to comply with the standard. This can result in redundant transmission of potentially many SPS syntax elements, with the resulting impact to coding efficiency, to enable signaling different levels for different layers or views. Second, the SPS is not directly being referred to from the slice header (or other coded picture high level syntax elements), but rather through one level of indirection: the slice header refers to a PPS, and the PPS refers to the SPS. In order to reference the appropriate SPS, there should be at least one PPS including the reference to the respective SPS. That PPS, in turn, may also differ from other PPSs (209) only by the PPS ID, which may be different because there is a need for a different SPS to signal a different level, as described above. As a result, there may not only be a need for multiple SPSs containing potentially many redundant values as described above, but also many PPSs also with many redundant parameters. Third, in order to signal different PPSs in the slice header, the average length of the (variable length) codeword used for signaling the PPS ID (202) can be longer when more different PPS IDs need to be signaled. Fourth, the codeword in the PPS referring to the SPS (204) is also variable length coded and can be longer when many SPSs are needed. And fifth, the same applies for the self references (206) (210) inside the SPS (205) and PPS (203), respectively.

SVC includes a scalability information SET message (SSEI message). According to H.264 or HEVC, a decoder is not required to decode and act upon substantially all SET messages, including the SSEI message, though not decoding and acting on an SET message may negatively impact user experience. However, a decoder may use information available in a SSEI message found in the bitstream for mechanisms such as resource management, and can rely on the values included in the SET message as being correct. The SSEI message provides, among other things, information about the number of layers present in the coded video sequence. For each of those layers, it can provide, directly or indirectly, a mapping of a layer id value to the priority, dependency, quality and temporal id values, which, in combination, can describe the position of the layer in the hierarchy of layers, as well as many other parameters describing each layer. Some of this additional parameters are optional even within the SET message, including profile and level information, and average bitrate. The profile and level information in the SSEI message can indicate decoding capability for the sub-bitstream associated with the target layer representation identified by the layer_id value. The level limits can be interpreted in the same manner as if the same level indicator value were included in a sequence parameter set. While, when used in this way, the SSEI includes enough information to allow a decoder to obtain profile and level information for each scalable layer, the aforementioned potentially redundant copies of PPS and SPS may be necessitated at the decoder (with the resulting negative effects for coding efficiency) for compliance with H.264.

Similarly, in MVC, the view scalability information SEI message provides information about the number of views present in the coded video sequence, and optionally provides profile and level information for the sub-bitstream associated with a target view representation.

Similar to H.264, HEVC has profile and level indicator syntax elements in the sequence parameter set. The level limits are based directly on the pixel rates (in contrast to H.264's MB rates) but otherwise the functionality is comparable. Table 1 shows the maximum pixel rate and picture size for levels in according to HEVC. Again assuming a fixed frame rate, there is a restriction on pixel throughput, such that the level limit pixel throughput MaxLumaPR>=PicSizeLuma*FrameRate, where PicSizeLuma refers to the size of the luma component of the picture in pixels:

TABLE 1

| Level | Pixel rate | picture size |
|---|---|---|
| 1 | 552,960 | 36,864 |
| 2 | 3,686,400 | 122,880 |
| 3 | 13,762,560 | 458,752 |
| 3.1 | 33,177,600 | 983,040 |
| 4 | 62,668,800 | 2,088,960 |
| 4.1 | 62,668,800 | 2,088,960 |
| 4.2 | 133,693,440 | 2,228,224 |
| 4.3 | 133,693,440 | 2,228,224 |
| 5 | 267,386,880 | 8,912,896 |
| 5.1 | 267,386,880 | 8,912,896 |
| 5.2 | 534,773,760 | 8,912,896 |
| 6 | 1,002,700,800 | 33,423,360 |
| 6.1 | 2,005,401,600 | 33,423,360 |
| 6.2 | 4,010,803,200 | 33,423,360 |

Table 1

For scalable and multiview extensions in HEVC, J. Boyce et. al, "High level syntax hooks for future extensions", January 2012, JCTVC-H0388, available from http://phenix_it-sudparis.eu/jct/doc_end_user/current_document.php?id=4691 and incorporated herein by reference in its entirety, discloses treating the scalable layer and multiview views similarly; that is, as layers. A layer can be identified by its layer_id value. The slice header of slices belonging to a given layer can contain a syntax element to reference a picture parameter set id. Included in the picture parameter set is a syntax element serving as a reference to a sequence parameter set.

In J. Boyce et. al, "Extensible High Layer Syntax for Scalability", JCTVC-E279, March 2011, available from http://phenix.int-evry.fr/jct/doc_end_user/current_document.php?id=2209 and incorporated herein by reference in its entirety, the sequence parameter set can include a dependency layer parameter set applicable to all layers of a coded video sequence, which can contain additional information about each layer. Such information can include an indication of the reference layer(s) required to decode a particular layer. Temporal layers are considered to be sub-layers and not (full) layers in the aforementioned sense. The result of a sub-bitstream extraction for a target layer can be a sub-bitstream called a layer set, and which can contain the NAL units associated with the particular (target) layer as well as NAL units of all reference layers required for decoding. The extracted layer set is itself a compliant bitstream. Sub-bitstream extraction can consider both a target layer and a target temporal id, resulting in a sub-layer set, which itself is also a compliant bitstream.

A straightforward integration of the aforementioned proposals into HEVC can lead to deficits similar to the ones mentioned in the context of MVC. Specifically, the coding of a level indicator in the SPS can lead to coding inefficiency due to the need of many SPSs differing only slightly (for example only by the level ID syntax element) from each other, which may lead to a need for many PPSs, unnecessary long variable codewords in the slice header to reference those multiple PPSs, and resulting coding inefficiency.

A need therefore exists for an improved techniques for level signaling in layered coding.

SUMMARY

The disclosed subject matter, in one embodiment, provides techniques to determine level ids in a layered bitstream, which allows for all level ids to be the same for all layers of the bitstream, which in turn allows for the use of the same sequence parameter set for all layers.

In certain embodiments, a level can be signaled for a sub-bitstream of the layered bitstream that can be lower than the level id in the SPS.

In the same or another embodiment, a profile can be signaled for a sub-bitstream.

In the same or another embodiment, the profile or level signaling can be in an SEI message.

BRIEF DESCRIPTION OF THE DRAWINGS

Further features, the nature, and various advantages of the disclosed subject matter will be more apparent from the following detailed description and the accompanying drawings in which:

FIG. 5 is a syntax diagram in accordance with an exemplary embodiment of the disclosed subject matter.

Figure 1:
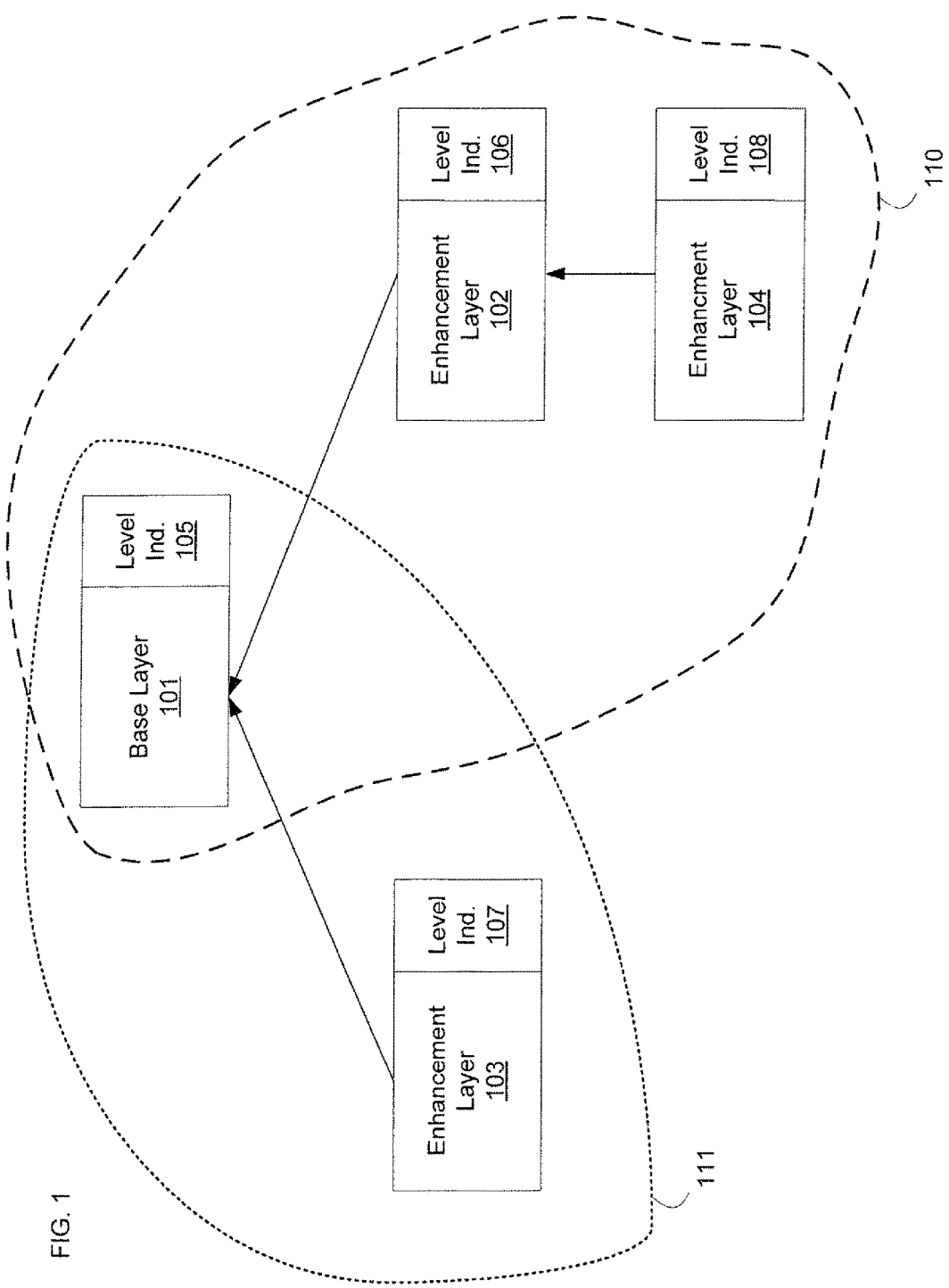
FIG. 1 shows a layer hierarchy.
Figure 2:
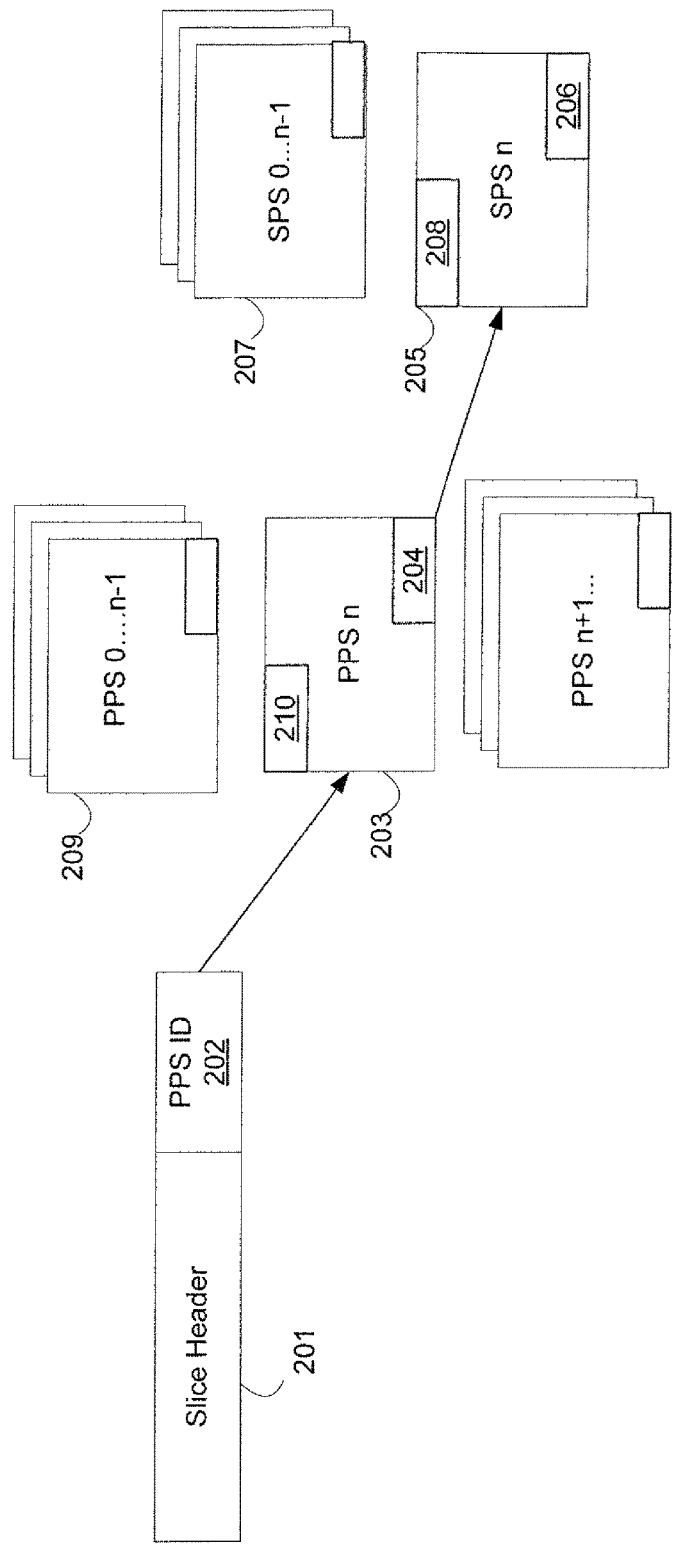
FIG. 2 shows the relationship between the slice header, PPS, and SPS.

The Figures are incorporated and constitute part of this disclosure. Throughout the Figures the same reference numerals and characters, unless otherwise stated, are used to denote like features, elements, components or portions of the illustrated embodiments. Moreover, while the disclosed subject matter will now be described in detail with reference to the Figures, it is done so in connection with the illustrative embodiments.

DETAILED DESCRIPTION

Described are methods and systems for video decoding, and corresponding techniques for signaling levels in a layered bitstream.

An aspect of the disclosed subject matter is applicable to scalable and/or multiview codecs, with a base layer and one or more non-base layers (enhancement layers henceforth) to represent additional scalable layers or views. The slice header for each layer can contain a syntax element referencing, directly or indirectly, an SPS. The syntax element can be a direct reference, for example an SPS id syntax element in the slice header, or an indirect reference, for example a picture parameter set id value in the slice header that refers to a PPS, which in turn includes an SPS id syntax element that refers to the SPS.

In an aspect of the disclosed subject matter, multiple layers with the same spatial resolution may refer to the same sequence parameter set, despite having different pixel throughput requirements to decode the multiple different sub-bitstreams associated with the target layers.

In an embodiment, the pixel throughput limitation constraint specified by the level indicator in the SPS of all layers is defined such that it is dependent only on the SPS parameters of the individual layer. As described above, in H.264 the level indicated for a given layer is chosen such that it allows for the computational complexity of the decoding of that target layer and all layers the target layer depends on.

Figure 3:
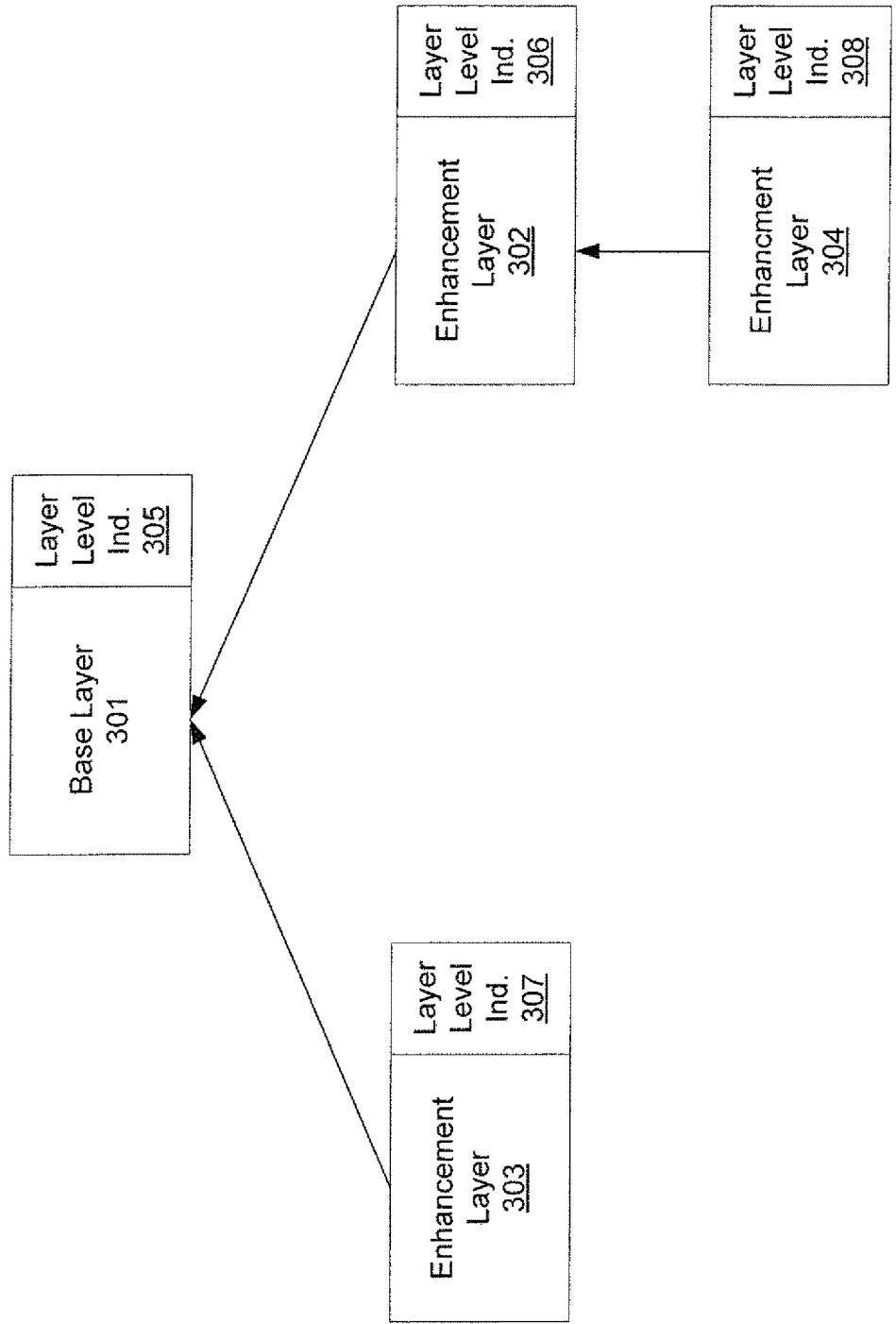
FIG. 3 shows a layer hierarchy in accordance with an exemplary embodiment of the disclosed subject matter.

Referring to FIG. 3, shown is a similar layering structure as in FIG. 1. One base layer (301) has its associated level (305), and three enhancement layers (302-304) have their associated respective level indicators (306-308). According to the same or another embodiment, the levels indicated by level indicators (306-308) indicated for the enhancement layers (302-304, respectively) are chosen such that the computational requirements indicated through the level indicators (306-308) are larger than the computational complexity required for the decoding of that enhancement layer in isolation, not counting the computational demands for decoding the reference layer(s) (if any). For example, the indicated by level indicator (308) associated with enhancement layer (304) can be chosen such that it only reflects the required computational resources to decode that enhancement layer (304) under the assumption that the reference layers (301) and (302) have already been decoded.

Coding in each layer only the level applying for the decoding of that layer can allow for multiple views or multiple scalable layers having the same spatial resolution to refer to the same sequence parameter set, without requiring an unnecessarily high level to be specified as already described. Doing so differs from the level limit constraint on macroblock throughput for SVC and MVC, which is calculated considering the throughput requirements of dependent layers or views. In order to clarify the different semantics of the level indicator as described herein, such a new level indicator can be marked in the standard text, for example by calling it a "layer level indicator".

The novel level indicator described above can improve coding efficiency compared to the use of the level indicator as used previously by reducing the number of SPSs, PPSs, and the average size of the PPS ID in the slice header and the SPS ID in the PPS required to be conveyed. However, there may be cases when a decoder would reject a bitstream it could decode, based on throughput requirements. This is because it may need to operate under a worst case assumption, which is all layers exercise all available throughput resources signaled in the level id, and that the decoder is not capable of handling such a throughput.

For example, if a base layer had a throughput requirement tpb, and an enhancement layer had a higher throughput requirement tpe, the (single) SPS would need signal a level that allows for tpe. As there are two layers (base and enhancement), the signaled throughput requirement would be 2 times tpe. The de-facto throughput requirements, however, would only be tpb+tpe, which can be lower than 2 times tpe. If the decoder were capable of decoding a bitstream with a throughput requirement larger than tpb+tpe, but lower than 2*tpe, then it would not know that it is capable to decode the bitstream based on the information available, and therefore could reject the bitstream, even if it were capable of decoding it.

To mitigate this situation, in the same or another embodiment, sub-bitstream level indicators, which can signal further constraints of the decoding complexity of a sub-bitstream, can be included in the bitstream. The sub-bitstream level indicators, according to the same or another embodiment, can be coded in the form of a high level syntax structure, for example a sub-bitstream information SEI message. Other high level syntax structures that can carry similar information include video parameter set, sequence parameter set, picture parameter set, adaptation parameter set, or slice header. Henceforth, described is the format of an SET message as one of many syntax structures in which the relevant information can be carried.

A table mapping each level id value to a pixel throughput limit, applicable to both layer levels and sub-bitstream levels, can be defined in the codec specification. The interpretation of the pixel throughput level limit constraint imposed upon a compliant bitstream through the layer level indicator in the sequence parameter set, according to an embodiment, can be based upon processing the particular individual layer. A constraint can be that the pixel throughput layer level limit is MaxLumaPR>=PicSizeLuma* FrameRate, both for the base layer or view and for all non-base layers and views, where PicSizeLuma is calculated from the picture horizontal and vertical size syntax elements in the sequence parameter set.

Figure 4:
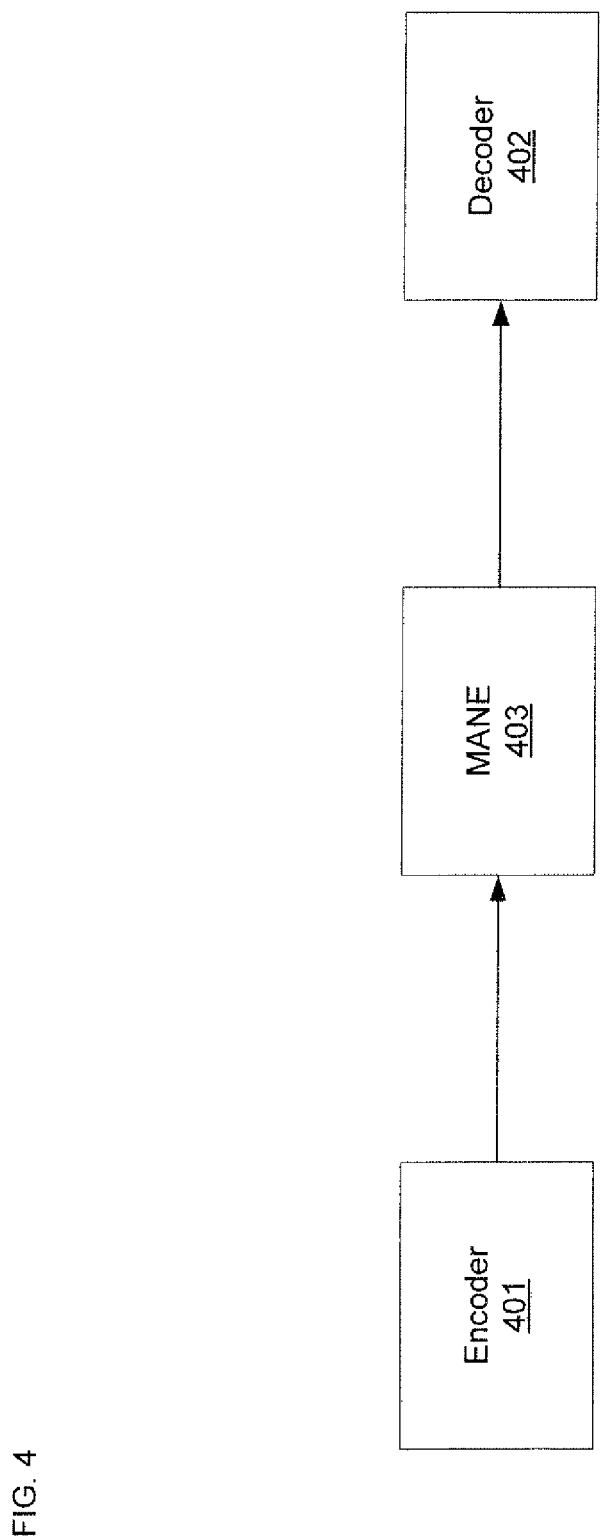
FIG. 4. shows a video transmission system in accordance with an exemplary embodiment of the disclosed subject matter.

Referring to FIG. 4, shown is a video transmission system comprising a bitstream source (401), for example an encoder, a decoder (402), and a Media-Aware Network Element (MANE) (403). Bitstream source (401), decoder (402) and MANE (403) can be connected over a network, for example an IP network such as the Internet (not depicted).

A decoder (402) or MANE (403) can check its capability for processing a scalable or multiview bitstream by considering the level limit constraint for each layer For example, assuming a decoder or MANE can support a certain level, which means (among other things) it has the capacity to process a certain number of coded pixels per second, then the decoder or MANE can sum up the computational requirements indicated by the level in each layer, starting with the lowest (base) layer, up to the point where the sum of computational requirements calculated exceeds its own capability. Layers higher than that capability can pose computational demands the decoder or MANE cannot cope with, and can, for example be discarded. Another reason to discard a layer can be that the link between MANE (403) and decoder (402) may not have the capacity to transmit the enhancement layer.

In some scenarios, a decoder or a MANE may know that it does not need to decode all layers, for example because a target layer is known. That can, for example, be the case when decoding a spatially scalable bitstream on a device with a screen resolution that is lower than highest enhancement layer. In such a scenario it can be desirable to decode only up to a target layer, which can be known to decoder or MANE through, for example, a user interface or a call control protocol. In such a case, the summing up of computational demands indicated by level indicators of enhancement layers can stop at the target layer, as all other layers are not being decoded anyway due to application demands, The complexity of the summation operation can further be limited because the number of dependent layers may be known from, or can be derived from information available in a higher layer parameter set, for example the Dependency Parameter Set.

Referring to FIG. 5, in the same or another embodiment, a sub-bitstream info SEI message can contain level id values for each of the allowable target layers (not depicted).

In the same or another embodiment, the SEI message can further include level id values (501) for combinations of the target layers with each of the target layer's temporal sub-layers. This level id value can be used to signal a constraint collectively applied to the sub-bitstream containing the entire layer set associated with the target layer. The level indicator in the SEI message can be interpreted differently than the level indicator in the SPS, and, therefore, it can be using a different designation as opposed to the aforementioned sub-bitstream level indicator.

In the same or another embodiment, the SEI message can also include sub-bitstreams profile information (502).

In the same or another embodiment, the SET message can include an extension mechanism for each sub-bitstream (503).

In the same or another embodiment, the level information (501), profile information (502), and extension mechanism (503) can be coded in two nested loops (504) (505), where the outer loop can cover all non-temporal layers or views (504) and the inner loop can cover all temporal layers (505).

In the same or another embodiment, the presence of profile and level information, respectively, can be indicated, per sub-bitstream (defined through a target non-temporal layer and a target temporal layer) by a flag (506) (507), or with separate flags for profile and level respectively. The flag can allow for "skipping" over sub-bitstreams that are not part of the bitstream, for example because the sub-bitstream would include a non-temporal or temporal layer that is not part of the bitstream.

In the same or another embodiment, the presence of profile and level information, respectively, can be indicated, per sub-bitstream (defined through a target non-temporal layer and a target temporal layer) with two separate flags for profile and level respectively, or with a single flag indicating the presence of profile signaling while level signaling is done by default. Different sub-bitstreams of the same coded bitstream with different target temporal layers may require different levels, even if they have the same profile. Allowing the level to be signaled without signaling the profile provides coding efficiency benefits. Similarly, a profile presence flag can be signaled for profile and level sub-bitstreams associated with a spatial or quality layers, allowing level to be signaled for a layer without requiring that profile be sent as well. A profile presence flag for sub-bitstreams associated with both spatial or quality layers and a target temporal layers can provide coding efficiency benefits by avoiding signaling of the profile, when the profile in unchanged but the level differs for different sub-bitstreams.

There are other ways to represent the absence of level and/or profile information of sub-bitstreams, beyond the flags based mechanism already described. For example, the information contained in the presence flags can be combined and coded in a variable length codeword. Or, the profile and level information can be variable length coded, and a short codeword can be selected to indicate the non-presence of a level or profile id. Alternatively, the syntax can include information about the early termination of the two loops (rather than running the loops over the maximum number of non-temporal or temporal layers allowed by the standard). Such alternatives are within the scope of the disclosed subject matter.

This approach differs from the profile and level indicator in the SVC scalability information SET message, which contains a single flag to signal the presence of both profile and level.

The constraint on pixel throughput for the sub-bitstream referenced by the sub-bitstream level indicator for target layer id i and target temporal id j, can be represented in accordance with equation (1):

$$MaxLumaPR \geq \sum_{k \in LS[i]} LayerPicSizeLuma[k] * FrameRate[k][j] \quad (1)$$

where k loops through all of the layers included in the layer set associated with layer i, LS[i], and FrameRate[k][j] is the frame rate for the j-th temporal sub-layer of the k-th layer, making the assumption that the frame rate is fixed for each temporal sub-layer of each layer. This constraint can also be expressed for variable frame rates.

Sub-bitstream profile and level indicators in the sub-bitstream SET message need not necessarily match the layer level indicators in the sequence parameter set, even when the particular sub-bitstream and layer contain the same coded bitstream data, e.g. when the sub-bitstream contains the base layer. Rather, the coded bitstream should comply with the constraints indicated by both the layer profile and level indicators in the sequence parameter set, and when present, the sub-bitstream profile and level constraints in the SEI message.

Having the sub-bitstream profile and level information available in an SEI message that may be sent in advance of the per layer sequence parameter sets can be advantageous for a decoder or MANE to determine its capability to process which layers and temporal sub-layers of the coded bitstream, immediately upon receipt of the SEI message.

Table 2 provides an illustrative example of the use of the invention in for a 3-view multiview bitstream, with 3 temporal sub-layers.

TABLE 2

| | Individual Layer | | Sub Bitstream | | |
|---|---|---|---|---|---|
| layer_id | Pixel Rate | Level | temporal_id | Pixel Rate | Level |
| 0 | 124,416,000 | 4.2 | 0 | 31,104,000 | 4 |
| | | | 1 | 62,208,000 | 4 |
| | | | 2 | 124,416,000 | 4.2 |
| 1 | 124,416,000 | 4.2 | 0 | 31,104,000 | 4 |
| | | | 1 | 62,208,000 | 4.2 |
| | | | 2 | 248,832,000 | 5 |
| 2 | 124,416,000 | 4.2 | 0 | 31,104,000 | 4.2 |
| | | | 1 | 62,208,000 | 5 |
| | | | 2 | 373,248,000 | 5.2 |

In the example, each layer has a resolution of 1920×1080. Temporal layer 0 is 15 fps, temporal layer 1 is 30 fps, and temporal layer 2 is 60 fps, for all 3 layers. The pixel rate for each individual layer is calculated in the table. Considering the HEVC constraints of Table 1, the level limit for each layer is calculated, which because they are of the same resolution, have the same level, which is signaled in the sequence parameter set. Layers 1 and 2 may refer to the same sequence parameter set. Additional columns show the pixel rate for the sub-bitstreams associated with each possible target layer id and temporal id. The level for each sub-bitstream is calculated using the HEVC constraints of Table 1. These sub-bitstream level constraints can be signaled in the sub-bitstream SEI message.

Considering the syntax of the sub-bitstream info SEI message for this example, max_layers_minus1 of 2 and max_temporal_layers_minus1 of 2 were sent in the higher level parameter set. sub_bitstream_profile_info_present_flag[i][j] is 0 for all values of i and j, because the profile does not change for the temporal sub-layers of a layer. sub_bit_stream_level_info_present_flag[i][j] is 1 for all values of i and j, and the level indicator associated with the level indicated in the rightmost column of Table 2 is sent.

Computer System

The methods for determining decodability of a layer, sub-layer, or layered bitstream, described above, can be implemented as computer software using computer-readable instructions and physically stored in computer-readable medium. The computer software can be encoded using any suitable computer languages. The software instructions can be executed on various types of computers. For example, FIG. 6 illustrates a computer system 600 suitable for implementing embodiments of the present disclosure.

Figure 6:
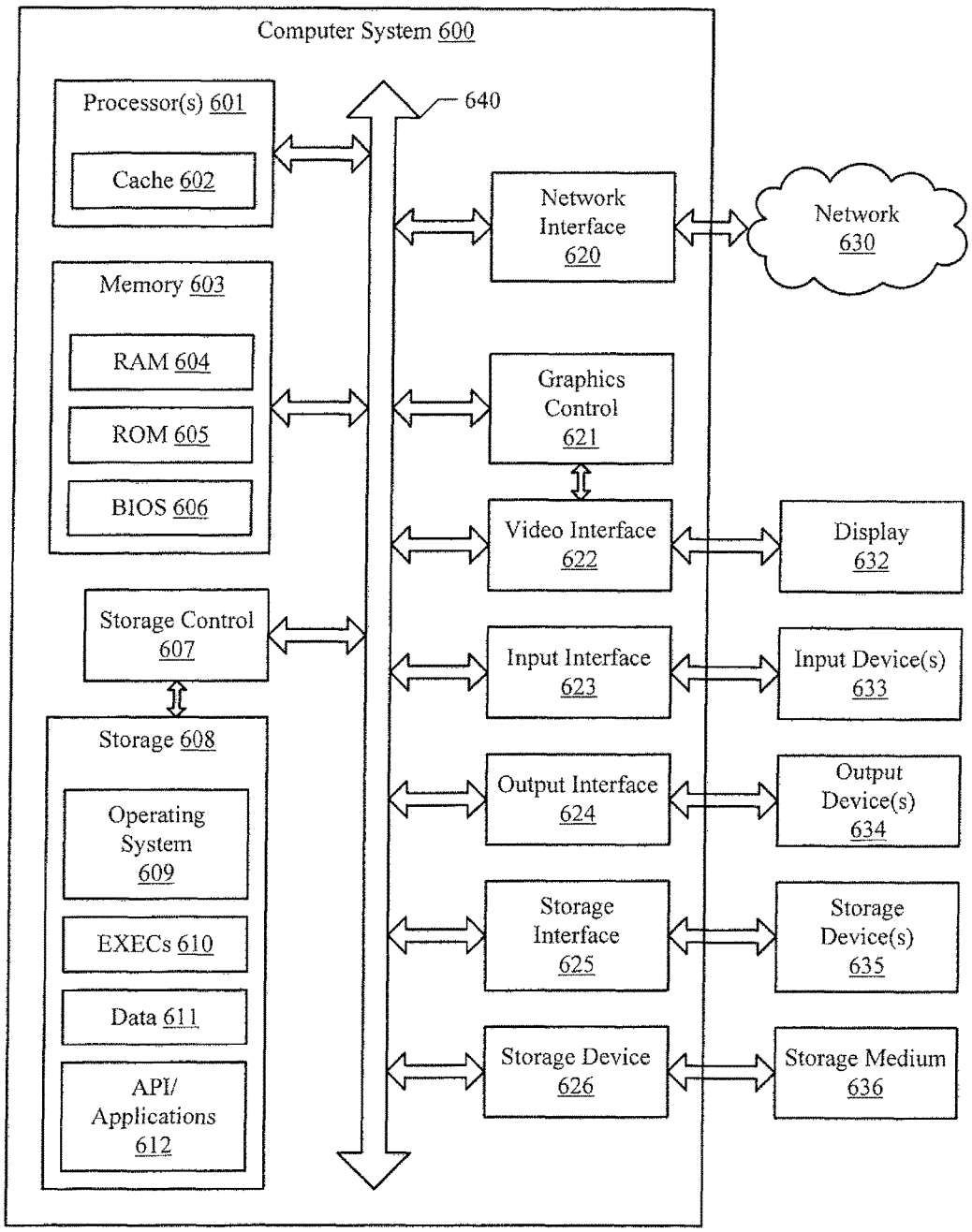
FIG. 6 is an illustration of a computer system suitable for implementing an exemplary embodiment of the disclosed subject matter.

The components shown in FIG. 6 for computer system 600 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system. Computer system 600 can have many physical forms including an integrated circuit, a printed circuit board, a small handheld device (such as a mobile telephone or PDA), a personal computer or a super computer.

Computer system 600 includes a display 632, one or more input devices 633 (e.g., keypad, keyboard, mouse, stylus, etc.), one or more output devices 634 (e.g., speaker), one or more storage devices 635, various types of storage medium 636.

The system bus 640 link a wide variety of subsystems. As understood by those skilled in the art, a "bus" refers to a plurality of digital signal lines serving a common function. The system bus 640 can be any of several types of bus structures including a memory bus, a peripheral bus, and a local bus using any of a variety of bus architectures. By way of example and not limitation, such architectures include the Industry Standard Architecture (ISA) bus, Enhanced ISA (EISA) bus, the Micro Channel Architecture (MCA) bus, the Video Electronics Standards Association local (VLB) bus, the Peripheral Component Interconnect (PCI) bus, the PCI-Express bus (PCI-X), and the Accelerated Graphics Port (AGP) bus.

Processor(s) 601 (also referred to as central processing units, or CPUs) optionally contain a cache memory unit 602 for temporary local storage of instructions, data, or computer addresses. Processor(s) 601 are coupled to storage devices including memory 603. Memory 603 includes random access memory (RAM) 604 and read-only memory (ROM) 605. As is well known in the art, ROM 605 acts to transfer data and instructions uni-directionally to the processor(s) 601, and RAM 604 is used typically to transfer data and instructions in a bi-directional manner. Both of these types of memories can include any suitable of the computer-readable media described below.

A fixed storage 608 is also coupled bi-directionally to the processor(s) 601, optionally via a storage control unit 607. It provides additional data storage capacity and can also include any of the computer-readable media described below. Storage 608 can be used to store operating system 609, EXECs 610, application programs 612, data 611 and the like and is typically a secondary storage medium (such as a hard disk) that is slower than primary storage. It should be appreciated that the information retained within storage 608, can, in appropriate cases, be incorporated in standard fashion as virtual memory in memory 603.

Processor(s) 601 is also coupled to a variety of interfaces such as graphics control 621, video interface 622, input interface 623, output interface 624, storage interface 625, and these interfaces in turn are coupled to the appropriate devices. In general, an input/output device can be any of: video displays, track balls, mice, keyboards, microphones, touch-sensitive displays, transducer card readers, magnetic or paper tape readers, tablets, styluses, voice or handwriting recognizers, biometrics readers, or other computers. Processor(s) 601 can be coupled to another computer or telecommunications network 630 using network interface 620. With such a network interface 620, it is contemplated that the CPU 601 might receive information from the network 630, or might output information to the network in the course of performing the above-described method. Furthermore, method embodiments of the present disclosure can execute solely upon CPU 601 or can execute over a network 630 such as the Internet in conjunction with a remote CPU 601 that shares a portion of the processing.

According to various embodiments, when in a network environment, i.e., when computer system 600 is connected to network 630, computer system 600 can communicate with other devices that are also connected to network 630. Communications can be sent to and from computer system 600 via network interface 620. For example, incoming communications, such as a request or a response from another device, in the form of one or more packets, can be received from network 630 at network interface 620 and stored in selected sections in memory 603 for processing. Outgoing communications, such as a request or a response to another device, again in the form of one or more packets, can also be stored in selected sections in memory 603 and sent out to network 630 at network interface 620. Processor(s) 601 can access these communication packets stored in memory 603 for processing.

In addition, embodiments of the present disclosure further relate to computer storage products with a computer-readable medium that have computer code thereon for performing various computer-implemented operations. The media and computer code can be those specially designed and constructed for the purposes of the present disclosure, or they can be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter. Those skilled in the art should also understand that term "computer readable media" as used in connection with the presently disclosed subject matter does not encompass transmission media, carrier waves, or other transitory signals.

As an example and not by way of limitation, the computer system having architecture 600 can provide functionality as a result of processor(s) 601 executing software embodied in one or more tangible, computer-readable media, such as memory 603. The software implementing various embodiments of the present disclosure can be stored in memory 603 and executed by processor(s) 601. A computer-readable medium can include one or more memory devices, according to particular needs. Memory 603 can read the software from one or more other computer-readable media, such as mass storage device(s) 635 or from one or more other sources via communication interface. The software can cause processor(s) 601 to execute particular processes or particular parts of particular processes described herein, including defining data structures stored in memory 603 and modifying such data structures according to the processes defined by the software. In addition or as an alternative, the computer system can provide functionality as a result of logic hardwired or otherwise embodied in a circuit, which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for determining, in a decoder, a capability for decoding a sub-bitstream comprising a layer and at least one first temporal sublayer in a video bitstream comprising at least the sub-bitstream and a second temporal sublayer, the method comprising:
    decoding a first level id associated with the layer;
    deriving a first pixel decoding rate from the first level id;
    decoding a second level id associated with the at least one first temporal sub layer;
    deriving a second pixel decoding rate from the second level id; and
    determining the sub-bitstream is not decodable but the layer is decodable,
    wherein the second pixel decoding rate is lower than the first pixel decoding rate.

2. The method of claim 1, wherein the second level id of the at least one first temporal sublayer is coded in a Supplementary Enhancement Information (SEI) message.

3. A non-transitory computer readable medium comprising a set of executable instructions to direct a processor to perform the method of claim 2.

4. A non-transitory computer readable medium comprising a set of executable instructions to direct a processor to perform the method of claim 1.

5. A system for determining a capability for decoding a sub-bitstream comprising a layer and at least one first temporal sublayer in a video bitstream comprising at least the sub-bitstream and a second temporal sublayer, the system comprising:
    a decoding device configured to:
        decode a first level id associated with the layer;
        derive a first pixel decoding rate from the first level id;
        decode a second level id associated with the at least one first temporal sub layer;
        derive a second pixel decoding rate from the second level id; and
        determine the sub-bitstream is not decodable but the layer is decodable,
    wherein the second pixel decoding rate is lower than the first pixel decoding rate.

* * * * *